Nov. 10, 1925.       1,560,896
A. DEWANDRE
MOTOR BRAKE
Filed Aug. 26, 1924    2 Sheets-Sheet 2
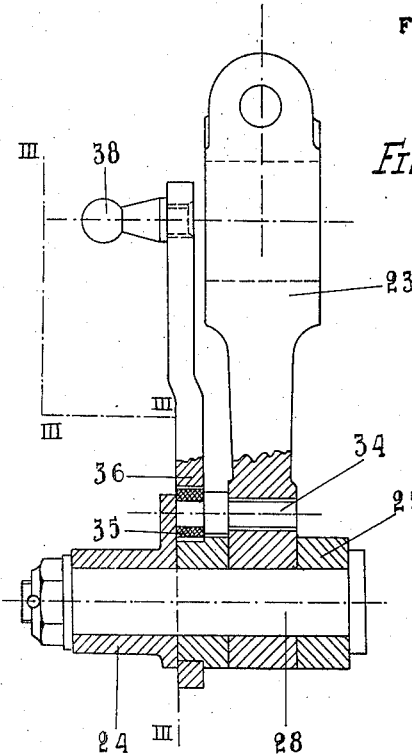
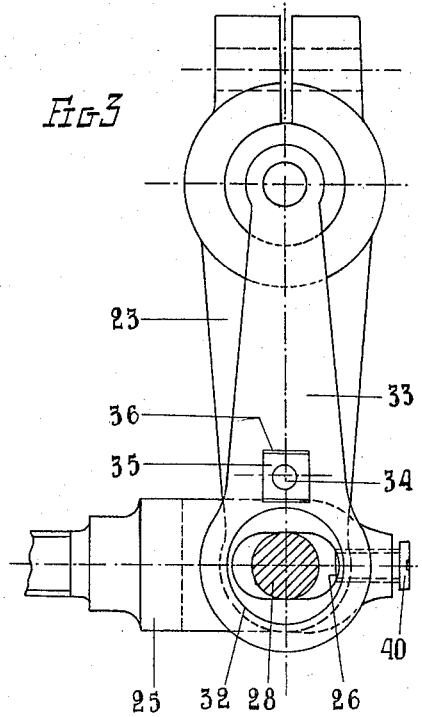
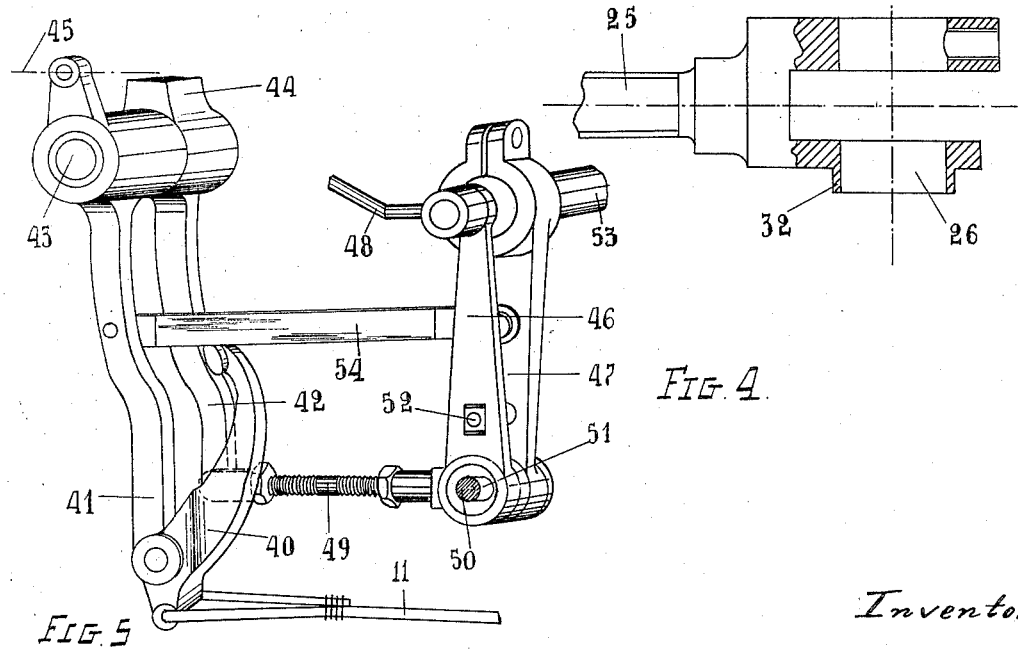
Inventor:
Albert Dewandre
By
Attorney Patented Nov. 10, 1925.

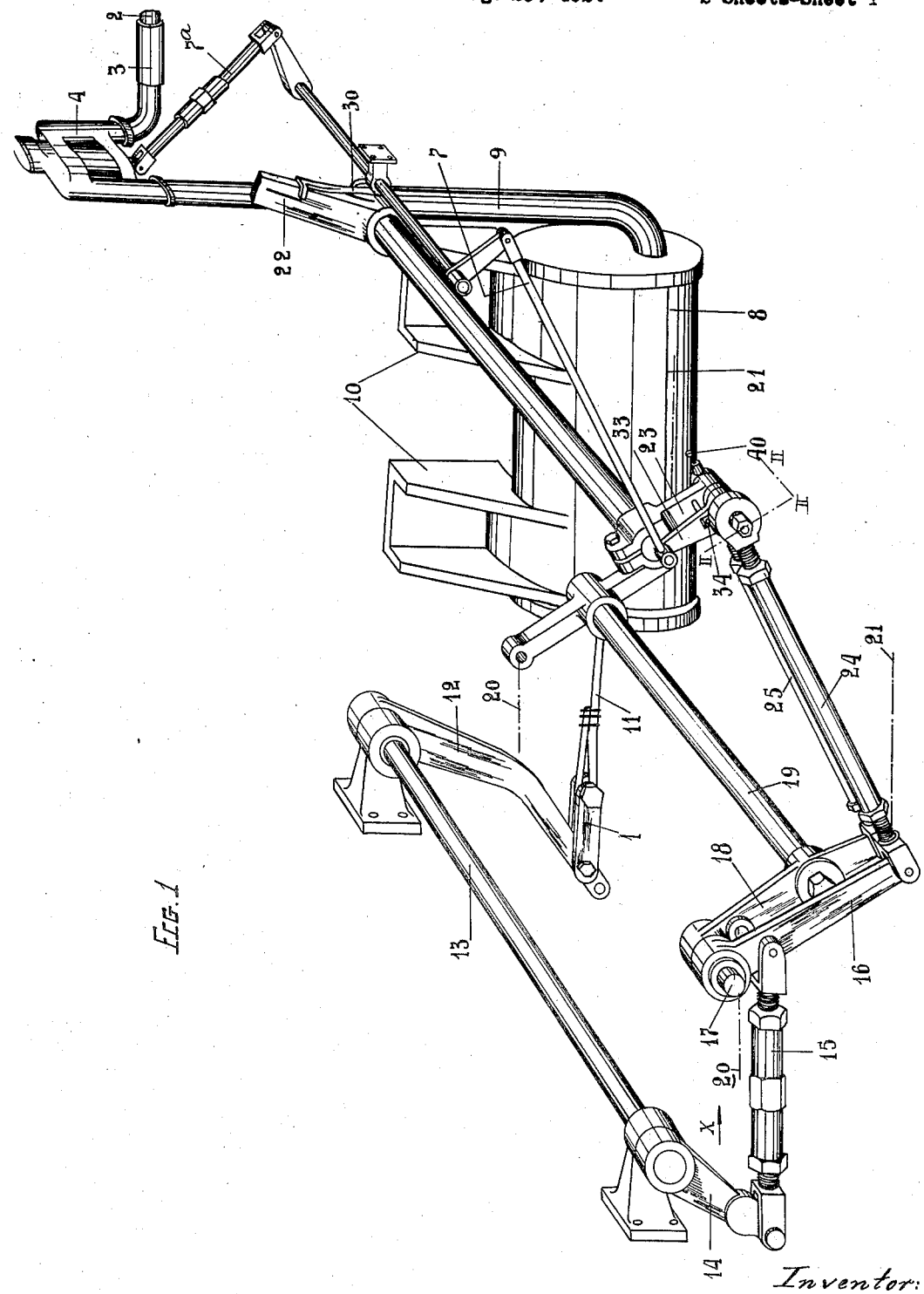

1,560,896

UNITED STATES PATENT OFFICE.

ALBERT DEWANDRE, OF LIEGE, BELGIUM.

MOTOR BRAKE.

Application filed August 26, 1924. Serial No. 734,299.

*To all whom it may concern:*

Be it known that I, ALBERT DEWANDRE, a subject of the King of Belgium, residing at Liege, in the Kingdom of Belgium, have invented certain new and useful Improvements in Motor Brakes, of which the following is a specification.

This invention relates to an improvement in or modification of my prior inventions described in my Patent No. 1,539,166, granted May 26, 1925, and in my application No. 699,022 filed March 13, 1924.

The object of the present invention is to provide a particularly advantageous form of construction of the prior arrangements.

According to the earlier constructions, the brake lever or pedal is joined to the brake gear by means of connecting pieces which permit a displacement of the said lever relative to the gear, this relative displacement controlling the distributor which puts the brake cylinder into communication with the suction of the engine.

In order to obtain for the operation of the brake lever or pedal an action which increases with the braking action exerted by the motor brake, the construction disclosed in application No. 699,022, provides for the connection of the motor part of the brake to a gear by means of a system of levers or cables which is also connected with the brake lever or pedal.

The main object of the present invention is to obtain the objects of the two earlier constructions by a simple mechanism which also permits the control of the distributor to be effected by means of connecting rods.

The characteristic features of the construction according to the present invention will be seen from the description of the apparatus hereinafter given by way of example with reference to the accompanying drawings which illustrate two forms of construction.

In these drawings:—

Figure 1 is a perspective view of a brake mechanism embodying the invention.

Figure 2 is an enlarged detail section taken along the line II—II—II of Figure 1.

Figure 3 is a part-sectional side elevation of Figure 2, as indicated by the line III—III thereof.

Figure 4 is a sectional view of a detail.

Figure 5 shows in perspective a second form of construction.

The mechanism illustrated in the drawings operates according to the general principles disclosed in the above mentioned cases, that is to say, the suction of the engine acts upon a piston comprised in a motor brake and connected to the brake rods.

According to the form of construction shown, there is arranged between the carburetor and the cylinder block (not shown) a hollow coupling connected by a neck 2, directed towards the dashboard (not shown) of the chassis, with a distributor 4 of a suitable type fixed to the said dashboard, connection between the distributor and the neck 2 being made by a flexible joint 3.

This distributor is provided with control rods 7 and 7ª acting as will be described later and allows the suction pipe of the engine to be put into communication with the cylinder 8 of the motor brake, which latter comprises the said cylinder and a piston (not shown) which works therein; the distributor being connected to cylinder 8 by means of a pipe 9, as has been described in the aforesaid prior cases. The cylinder 8 is fixed to the longitudinal member of the chassis by means of brackets 10 cast on the cylinder.

In the form of construction shown in Figures 1 to 4, the previously mentioned piston of the cylinder 8 is displaced under the influence of the suction of the engine and pulls a cable 11 connected also to a lever 12 keyed on a shaft 13 turning in suitable supports mounted on the chassis.

At the other extremity of the shaft 13 is keyed in addition a second lever 14 which will accordingly move in the direction of the arrow X under the influence of the suction of the engine and will produce the displacement of the connecting rod 15 of adjustable length. This connecting rod operates a transmission lever 16 one extremity of which carries a movable pin 17 on which is also mounted a second lever 18 pivoting about the fixed shaft 19, and forming a part of the brake rodding.

The connecting rods 20 and 21, which operate the rear and front brakes, respectively, are directly attached to the said lever 18 on opposite sides of the fixed shaft 19.

In order to enable the operation of the connecting rods or links 7 and 7ª of the distributor 4 and also to exert on the brake pedal or brake lever 22 a reaction increasing with the intensity of braking action, the levers 16 and 18 are respectively connected at their lower ends by rods 24 and 25 to a lever 23, keyed to the shaft of the brake pedal.

The head of the rod 25 is provided with an oval opening 26, Fig. 3, the major axis of which is arranged along the direction of the rod, and in which can move a lateral pin or stud 28 on the lever 23 which also moves the rod 24.

It is seen by this arrangement that the displacement of the lever 16 upon operation of the motor brake, will exert by means of the rod 24 a reaction on the pedal which will be directly opposed to the effort exerted by the driver and the intensity of which will increase with the action exerted on the brake drums.

This connection will also allow the direct working of the brakes by the pedal in case of failure of the motor brake to operate.

The combination of oval slot 26 and pin 28 forms a lost motion coupling between the pedal and the brake rodding.

In the position of rest, the pedal occupies normally the position shown, under the action of a returning spring 30, in such a manner that the pin 28 butts against the front face of the slot 26 or against a regulating screw 40.

When the pedal is operated, a relative displacement is produced between the lever 23 and the rod 25 due to the lost motion connection above referred to. It is this displacement which is made use of to effect the operation of the distributor. To this end the rod 25 carries laterally and concentrically with the oval slot 26 a cylindrical shoulder 32 on which can turn an arm 33 which is additionally connected to the fixed stud 34 carried by the lever 23.

The connection between the stud 34 and the arm 33 is made by means of a square block or member 35 which can slide slightly in a slot 36 made in the arm 33.

The other extremity of this arm 33 carries a pin 38 connected to the end of the adjacent driving link 7 of the distributor.

It is to be mentioned that the pin 38 remains approximately arranged along the axis of pivotal movement of the brake pedal in such a manner that the displacement of the pedal does not affect the said pin 38.

As has been already mentioned, this particular construction of the mechanism of the motor brake operates according to the same principles as those which are described in my earlier applications.

When a pull is exerted on the pedal 22, the pin 28 is displaced in the oval slot 26, and the lever 33 is turned by the action of the stud 34, around the shoulder 32 of the rod 25.

The said arm or lever 33 is thus displaced relatively to the lever 23 by turning slightly around the stud 34.

In this relative motion, the pin 38 is displaced relatively to the fixed axis of the pedal 22, and thus acts on the rods 7 and 7a which control the distributor 4.

This last permits of the transmission of the engine suction to the cylinder 8 and thus applies the brakes.

The appliance of the brakes causes the rod 25 to move, so that its oval slot 26 tends to take, relatively to the pin 28, a position in which the pin 38 of the lever 33 is caused to move toward its initial position to an extent sufficient to ensure the disconnection of the cylinder 8 from the engine suction, but not sufficient to open said cylinder to the atmosphere.

This last action occurs only when the pedal 22 makes its return movement.

This invention also provides for the placing of the distributor on the engine casting so as to dispense with the neck 2. With this object in view the suction passage formed in the engine casting would have a supplementary outlet to which the distributor would be directly attached.

The invention also provides for placing the distributor on the cylinder of the motor brake or on the bottom of the cylinder.

According to the second form of construction shown in Figure 5, the cable 11, attached to the piston of the motor cylinder (not shown), acts on a lever 40 which is pivoted to a lever 41 and which bears at its other extremity against a lever 42 which forms an extension of the brake lever or pedal 44 pivoted on the shaft 43.

The swinging lever 40 acts therefore like a reaction piece in a reverse direction to the effort exerted by the operator on the pedal and proportionally to the brake action exercised on the brake drums.

The brake cable 45 which actuates said drums is also connected to the lever 41.

The operation of the distributor, not shown on the drawings, is effected as already described in Figures 1 to 4 by the relative displacement which is produced between the lever 46 connected to the rod 48 which actuates the distributor and the second lever 47 the latter being connected to a stud 52 carried by the first lever 46 and pivoted on a fixed shaft 53.

The rod 49 carries a part provided with an oval slot 51 which is traversed by a pin 50 rigid with the lever 47 in the same way that the slot 26 of the rod 25, is traversed by the pin 28 rigid with the lever 23. The lever 47 is connected to the lever 41 by a rod 54 in the same way that the lever 23 is connected to the transmission lever 16 by the rod 24.

A push on the pedal 44 rocks the lever 42 and hence moves the rod 49 thus causing a relative displacement between the oval slot 51 and the pin 50. The lever 46, the lowest part of which turns on an annular shoulder formed on the rod 49, is thus caused to slightly rotate around the axis 52, and by this movement the rod 48 is forced to act on the distributor.

When the brakes are displaced, the rod 54 moves also and acts on the lever 47 so as to displace the pin 50 rigid with it in the slot 51. By this movement the pin is shifted until it reaches in the slot 51 a position corresponding to the disconnection of the engine suction.

The pin is restored to its initial position when the pedal makes its return movement which is transmitted to the rod 49 and, hence, to the part of said rod which is provided with the slot 51.

What I claim is:

1. In a brake system for motors, the combination, with a suction pipe, a distributor therein, and rodding for the brakes, of a brake motor connected with the rodding to actuate the same and adapted to be placed in alternative communication with said pipe and with the atmosphere by the distributor; a controlling lever for operating said distributor; a pair of arms articulated together, one arm being positively connected to said lever and the other arm having a lost-motion connection therewith; connecting means between one arm and the brake rodding; and a connection between the distributor and one arm to operate the former consequent upon a variation in the relative positions of the two arms.

2. In a brake system for motors, the combination, with a suction pipe, a distributor therein, and rodding for the brakes, of a brake motor connected with the rodding to actuate the same and adapted to be placed in alternative communication with said pipe and with the atmosphere by the distributor; a controlling lever for operating said distributor; a pair of arms articulated together, one arm being positively connected to said lever and the other arm having a lost-motion connection therewith; connecting means between one arm and the brake rodding; a connection between the distributor and one arm to operate the former consequent upon a variation in the relative positions of the two arms; and a supplemental connection between said arms operatively associated with the brake motor to transmit the action of the latter to said lever.

3. In a brake system for motors, the combination, with a suction pipe, a distributor therein, and rodding for the brakes, of a brake motor connected with the rodding to actuated the same and adapted to be placed in alternative communication with said pipe and with the atmosphere by the distributor; a controlling lever for operating said distributor; a pair of arms articulated together, one arm being positively connected to said lever and the other arm having a lost-motion connection therewith; connecting means between one arm and the brake rodding; a connection between the distributor and one arm to operate the former consequent upon a variation in the relative positions of the two arms; a member connected to one of said arms; a lever pivoted to said member; a connection between the second-named lever and the other arm; and separate connecting means between said second-named lever and the brake motor to transmit the action of the latter to the former.

In testimony whereof I have affixed my signature.

ALBERT DEWANDRE.